United States Patent [19]

Akashi et al.

[11] 3,916,039

[45] Oct. 28, 1975

[54] METHOD OF PRODUCING MAGNETIC RECORDING TAPE

[75] Inventors: Goro Akashi; Masaaki Fujiyama; Yasuyuki Yamada; Koshu Kurokawa, all of Odawara, Japan

[73] Assignee: Fuji Photo Film Co., Ltd., Minami-ashigara, Japan

[22] Filed: Dec. 15, 1971

[21] Appl. No.: 208,236

[30] Foreign Application Priority Data

Dec. 15, 1970 Japan .............................. 45-112037

[52] U.S. Cl. ................ 427/128; 427/132; 427/209; 427/365

[51] Int. Cl.$^2$ .......................................... H01F 10/00

[58] Field of Search ........................... 117/235–240; 1/111 R; 427/132, 209, 365

[56] References Cited

UNITED STATES PATENTS

| | | | |
|---|---|---|---|
| 2,804,401 | 8/1957 | Cousino | 117/235 |
| 3,148,082 | 9/1964 | Ricco et al. | 117/237 |
| 3,216,846 | 11/1965 | Hendricx et al. | 117/237 |
| 3,276,946 | 10/1966 | Cole et al. | 117/239 X |
| 3,293,066 | 12/1966 | Haines | 117/237 X |
| 3,398,011 | 8/1968 | Neirotti et al. | 117/237 |
| 3,473,960 | 10/1969 | Jacobson et al. | 117/237 |
| 3,617,378 | 9/1969 | Beck | 117/235 |

FOREIGN PATENTS OR APPLICATIONS

| | | | |
|---|---|---|---|
| 1,347,398 | 1/1963 | France | 117/239 |
| 1,147,262 | 4/1959 | Germany | 117/237 |

*Primary Examiner*—Bernard D. Pianalto
*Attorney, Agent, or Firm*—Sughrue, Rothwell, Mion, Zinn & Macpeak

[57] ABSTRACT

A method of producing a magnetic recording tape comprising the steps of providing a back layer on the back surface of the magnetic tape having a magnetic layer on the surface of a base thereof, said back layer being able to absorb the surface roughness of a roller, and calendering said tape through a space between a metal roller and a nonmetal roller, said nonmetal roller being in contact with said back layer side of said tape.

13 Claims, 5 Drawing Figures

METHOD OF PRODUCING MAGNETIC RECORDING TAPE

BACKGROUND OF THE INVENTION

1. Field of the Invention

The present invention relates to a method of producing magnetic recording tape, and more specifically to a method of producing a magnetic recording tape having a smooth surface which is suitable for recording short wave signals.

2. Description of the Prior Art

The use of magnetic recording tape has become enlarged from the comparatively long wave recording such as voices, musical sounds and the like to a shorter wave recording such as television images, signals for electronic computors and the like. Accordingly, nowadays, a magnetic recording tape of high quality is required to record such shorter wave signals with higher recording density.

The conditions required for such magnetic recording medium to record the shorter wave length signals are:

1. Concentration of the magnetic material is high.
2. Coercive force is properly high.
3. Surface of the magnetic layer is as smooth as possible.

The first requirement is concerned with the concentration of the magnetic material in the magnetic layer, and accordingly, is determined by the ratio of the magnetic material to a binder. If the content of the magnetic material, however, is increased, the magnetic layer becomes brittle and liable to fall off. Accordingly, there is naturally a limit in the content of the magnetic material. However, the requirement for the high concentration is fulfilled to its substantially limited extent since the reproduction sensitivity is desired to be as high as possible even in normal magnetic recording tape. Therefore, it is practically very difficult to increase the concentration of the magnetic material over conventional ones.

The second requirement concerned with the high coercive force of the magnetic material is easily met by adding other kinds of metal elements such as Co, Ni, Mn, Cr, etc. to the magnetic material in the manufacturing process. Generally, however, it is also required to change the recording conditions when the coercive force is changed. Therefore, it is very disadvantageous in practical sense to change the coercive force. For example, where a magnetic material of high coercive force of 500 to 600 Oe is used instead of a magnetic material of coercive force of 250 to 300 Oe generally used, as bias magnetic field or input level (at the time of recording without bias) twice as large as general should be provided. Accordingly, in the recording devices now commercially available, there is naturally a limitation in this sense.

The third requirement concerned with the smooth surface of the magnetic layer is considered to be met by various kinds of methods as represented by the following:

1. The magnetic layers are abraded with each other to polish the surfaces thereof.
2. The magnetic layer is polished by means of a steel or nylon brush.
3. The surface of the magnetic layer is pressed by the pressure of a calender roller.

Among the above methods, the third one using a calender roller is generally utilized since a comparatively superior surface can be obtained thereby. This method, however, requires a press roller carrying a perfectly smooth surface. This will be better understood by referring to a drawing. FIG. 1 is a side sectional view showing an example of the conventional method of pressing a magnetic thin material having a smooth surface, in which the reference numeral 1 indicates a metallic roller and 2 indicates a fiber roller having a surface made of long fibers. The reference numeral 5 designates a magnetic layer and 6 designates a substratum, the direction in which they advance being indicated by arrow 3. Since, as shown in the drawing, the magnetic layer is pressed between a metallic roller and a nonmetallic roller, the surface of the metallic roller is required to be as smooth as possible. Accordingly, in the conventional method, a roller having a surface which is chrome plated has been used.

In pactice, however, there is a limit in the accuracy of the smoothness of the surface of the magnetic layer obtained, and the limit seems to be influenced by the smoothness of the surface of a non-metallic (for example fiber) roller which is brought into contact with the back surface, namely the base surface of the magnetic tape.

SUMMARY OF THE INVENTION

We, the inventors made a study as to the method in which the smoothness of the magnetic layer is not influenced by the smoothness of the fiber roller of long fibers in the case that the surface of the magnetic tape is processed by a hard roller (metal roller) and a soft roller (fiber roller of long fibers) as described above. As the result of the study, we the inventors, found and confirmed that a superior surface could be obtained even under conditions substantially equal to those of the conventional method by providing a layer which absorbs the roughness on the surface of the fiber roller which is in contact with the opposite surface of the magnetic tape to the magnetic layer.

As apparent from the above description of the invention with reference to the prior art, the primary object of the present invention is to provide a method of producing a magnetic recording tape having a smooth surface.

Another object of the present invention is to provide a method of producing a magnetic tape in which the S/N ratio of the magnetic tape produced is improved.

In order to accomplish the above objects of the present invention, the magnetic tape is provided with a resilient or plastic layer on the back surface thereof in advance before it is passed between a super calender roller and a fiber roller. The roughness of the surface of the calender roller is absorbed by the resilient or plastic layer.

Other objects, features and advantages of the present invention will be made apparent from the following description of the preferred embodiments thereof taken in conjunction with the accompanying drawings in which:

Figure 1:
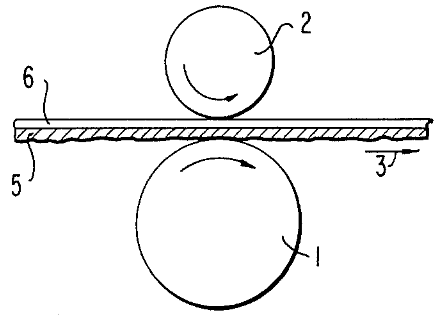
FIG. 1 is a side view of an example of a conventional roller device for producing a magnetic recording tape.
Figure 2:
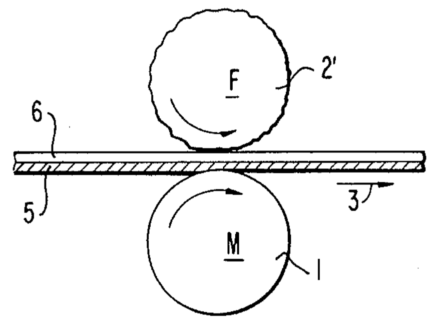
FIG. 2 is a side sectional view showing an embodiment of the roller device for carrying out the method in accordance with the present invention.
Figure 3:
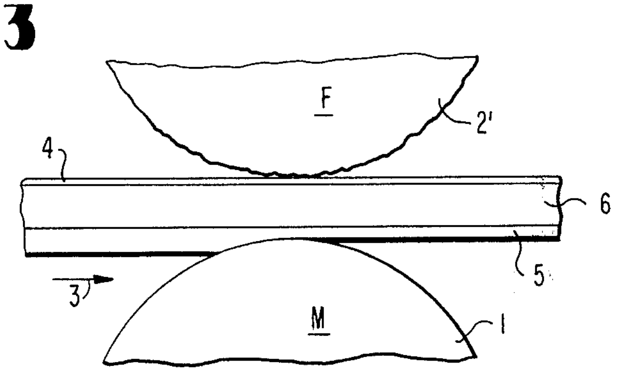
FIG. 3 is an enlarged side view showing a portion of the roller device and the magnetic recording tape processed thereby carrying out the method of producing a magnetic recording medium in accordance with the present invention.

DETAILED DESCRIPTION OF THE INVENTION:

Referring now to FIGS. 2 and 3, reference numeral 1 indicates a metal roller, 2′ a fiber roller disposed at a position spaced apart from the metal roll by a slight distance for passing a magnetic tape therethrough for calendering, 6 indicates a base, 5 indicates a magnetic layer coated on one surface of the base 6, and 4 indicates a back layer coated on the other surface thereof.

The magnetic layer 5 on the base 6 is calendered when the tape is passed through the small space between the fiber roller 2′ and the metal roller 1 in the direction shown by arrow 3.

Figure 4:
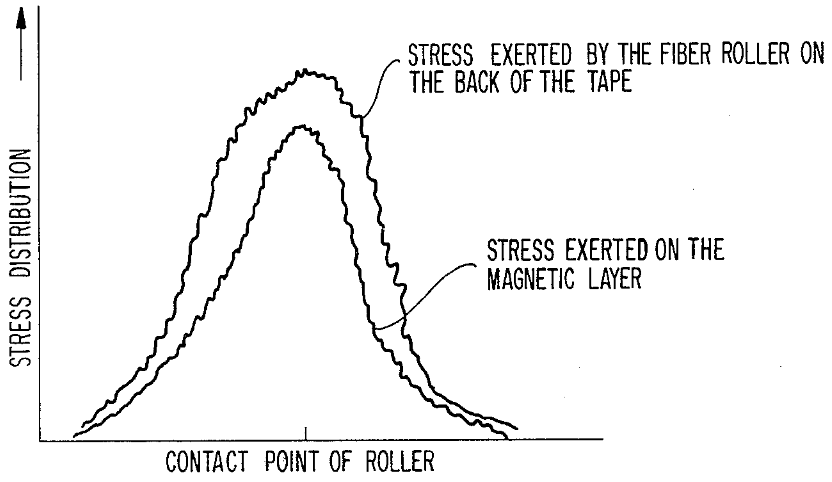
FIG. 4 is a graphical representation showing the distribution of stress around the contact point of the roller measured in the case of the conventional rolling method.
Figure 5:
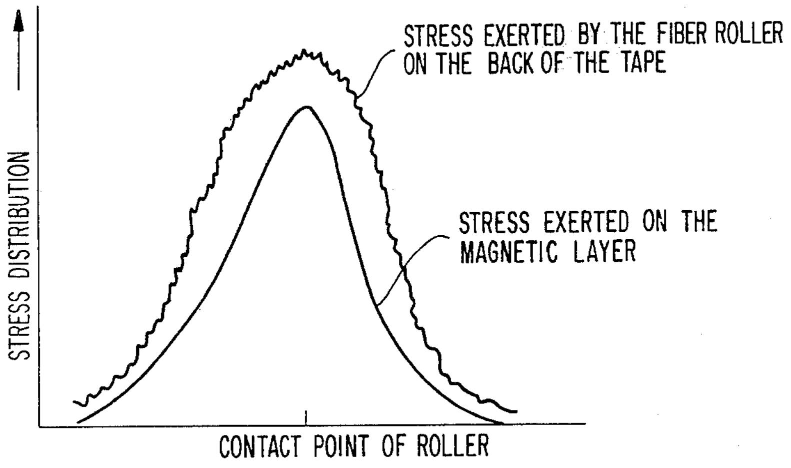
FIG. 5 is a graphical representation showing the distribution of stress measured in the same sense as FIG. 4 in the case of the method in accordance with the present invention.

The distribution of the stress exerted on the magnetic layer 5 is as shown in FIGS. 4 and 5 when the tape is passed through the space between the metal roller 1 and the fiber roller 2′. FIG. 4 shows the distribution of the stress in the case that the magnetic tape is not provided with the back layer 4 or the magnetic tape is provided with a back layer having no elasticity or plasticity. In this case, the roughness of the surface of the fiber roller made of long fibers is transmitted to the magnetic layer as it is, and accordingly, the surface of the magnetic layer becomes rough.

FIG. 5 shows the distribution of the stress in the case that the magnetic tape is provided with a resilient or plastic back layer. In this case, the roughness of the surface of the fiber rollers is transmitted to the tape surface, but the roughness is absorbed by the distribution of the resilient or plastic layer 4 provided on the back surface of the tape. Accordingly, uniform pressure is transmitted to the magnetic layer of the tape. Thus, a magnetic tape having a magnetic layer with a smooth surface can be obtained.

Several examples of the present invention will now be described in detail.

EXAMPLE 1

Carbon black was mixed with urethane rubber at a mixing ratio of 1:1, and they were then sufficiently mixed with each other in an organic solvent by means of a ball mill. The mixture was coated on the back surface of a magnetic tape as the back layer with a thickness of 2.5 when dried. Thereafter, the magnetic tape was processed through a calender roller as shown in FIG. 2. The sample thus produced was numbered No. 1.

EXAMPLE 2

Instead of the carbon black used in Example 1, titanium oxide was used, and instead of the urethane rubber in Example 1 a synthetic rubber was used, chlorosulfonated polyethylene (Hyperlon). The sample thus produced was numbered No. 2.

EXAMPLE 3

Carbon black and ethylene-vinyl acetate copolymer were used. The sample thus produced was numbered No. 3.

EXAMPLE 4

Graphite powder and a thermoplastic polyurethane resin (Elastolan) were used. The sample thus produced was numbered No. 4.

Although in the above examples carbon black, titanium oxide, and graphite were used, carbon black is the most preferable from the viewpoint of antistatic effect. It will be understood that titanium oxide and other inorganic pigment particles can be used if an antistatic agent is mixed thereinto. The purpose of mixing the inorganic pigment particles into the back layer lies in the effect of increasing the abrasion resistance of the tape, which is well known in the art.

The synthetic resins in the above examples all have proper resilience and are all able to absorb the roughness of the surface of the fiber roller.

Alternatively, the back surface of the magnetic tape could be provided with a proper porous construction, whereby the porous surface of the tape absorbs the roughness of the fiber roller surface. Five other samples were made as follows, in which the precentage in the blankets are the ratio of the porous area to the total surface.

| | |
|---|---|
| No. 5 (Sample number) | A binder mainly composed of cellulose nitrate was used for binding carbon black. (17%). |
| No. 6 | Linear polyester was used as the binder for binding carbon black. (15%) |
| No. 7 | Titanium oxide and vinyl chloride acetate resin were used (18%) |
| No. 8 | Graphite particles and urea resin were used. (20%) |
| No. 9 | Tape without the back layer. |

The surface smoothness of the samples No. 1 to 4 was measured in comparison with reference samples No. 5 to 9. The smoothness of the surface of the tape was measured by measing light reflected by the surface of the tape at an angle of 45° received by a photomultiplier tube. The smoother the surface, the stronger is the reflected light, and accordingly the better is the surface property of the tape. The results of the measurements are as follows:

Table 1

| Sample | Intensity of the reflected light (Peak value read in the recorder in mV) |
|---|---|
| No. 1 | 305 |
| No. 2 | 298 |
| No. 3 | 320 |
| No. 4 | 318 |
| Reference Sample | (mV) |
| No. 5 | 290 |
| No. 6 | 302 |
| No. 7 | 295 |
| No. 8 | 294 |
| No. 9 | 226 |

Further, in the case that the above samples were made into video tapes for broadcast, the image S/N as one of the electromagnetic conversion properties can be represented as follows, through our measurement.

Table 2

| Sample | S-N ratio (dB) (the S/N of the tape without back layer No. 9 is standardized as OdB) |
|---|---|
| No. 1 | +2.3 |
| No. 2 | +1.8 |
| No. 3 | +2.4 |
| No. 4 | +2.3 |
| No. 5 | +1.9 |
| No. 6 | +1.8 |
| No. 7 | +1.7 |
| No. 8 | +1.8 |
| No. 9 | 0 (standard) |

While the invention has been particularly shown and described with reference to preferred embodiments thereof, it will be understood by those skilled in the art that various changes in form and details may be made therein without departing from the spirit and scope of the invention.

What is claimed is:

1. A method of producing a magnetic recording tape having a smooth surface comprising the steps of providing a back layer on the back surface of the magnetic tape having a magnetic layer on the surface of a base thereof, said back layer being able to absorb the surface roughness of a roller, and calendering said tape through a space between a metal roller and a nonmetal roller, said nonmetal roller being in contact with said back layer side of said tape whereby said tape possesses improved magnetic properties.

2. Method of producing a magnetic recording tape as defined in claim 1 wherein said back layer is a resilient layer.

3. Method of producing a magnetic recording tape as defined in claim 1 wherein said back layer is a plastic layer.

4. Method of producing a magnetic recording tape as defined in claim 1 wherein said back layer is a porous layer.

5. Method of producing a magnetic recording tape as defined in claim 2 wherein said resilient layer is composed of mixture of carbon black and urethane rubber.

6. Method of producing a magnetic recording tape as defined in claim 2 wherein said resilient layer is composed of titanium oxide and synthetic rubber.

7. Method of producing a magnetic recording tape as defined in claim 6 wherein said synthetic rubber is chlorosulfonated polyethylene.

8. Method of producing a magnetic recording tape as defined in claim 3 wherein said plastic layer is composed of carbon black and ethylenevinyl acetate copolymer.

9. Method of producing a magnetic recording tape as defined in claim 3 wherein said plastic layer is composed of a graphite particles and thermoplastic polyurethane.

10. Method of producing a magnetic recording tape as defined in claim 4 wherein said porous layer is composed of carbon black bound by a binder mainly composed of cellulose nitrate.

11. Method of producing a magnetic recording tape as defined in claim 4 wherein said porous layer is composed of carbon black and a binder mainly composed of linear polyester.

12. Method of producing a magnetic recording tape as defined in claim 4 wherein said porous layer is composed of titanium oxide and vinyl chloride acetate resin.

13. Method of producing a magnetic recording tape as defined in claim 4 wherein said porous layer is composed of graphite particles and urea resin.

* * * * *